(12) United States Patent
Li et al.

(10) Patent No.: US 9,900,291 B2
(45) Date of Patent: *Feb. 20, 2018

(54) METHODS AND APPARATUS FOR SYNCHRONIZING DECRYPTION STATE WITH REMOTE ENCRYPTION STATE

(71) Applicant: Sonus Networks, Inc., Westford, MA (US)

(72) Inventors: Shiping Li, Acton, MA (US); Prashant Motagi, Chelmsford, MA (US); Gregory Paul Khederian, Westford, MA (US)

(73) Assignee: Sonus Networks, Inc., Westford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/608,832

(22) Filed: May 30, 2017

(65) Prior Publication Data

US 2017/0272408 A1    Sep. 21, 2017

Related U.S. Application Data

(63) Continuation of application No. 14/841,276, filed on Aug. 31, 2015, now Pat. No. 9,722,976.

(60) Provisional application No. 62/121,287, filed on Feb. 26, 2015.

(51) Int. Cl.
*H04K 1/00* (2006.01)
*H04L 29/06* (2006.01)
*G06N 99/00* (2010.01)
*H04W 12/08* (2009.01)
*H04M 7/00* (2006.01)

(52) U.S. Cl.
CPC ....... *H04L 63/0428* (2013.01); *G06N 99/005* (2013.01); *H04L 65/60* (2013.01); *H04M 7/006* (2013.01); *H04W 12/08* (2013.01)

(58) Field of Classification Search
None
See application file for complete search history.

(56) References Cited

U.S. PATENT DOCUMENTS

2006/0062393 A1* 3/2006 Hsu .................. H04L 9/0861
380/281
2007/0260870 A1* 11/2007 Nissan ............ H04L 29/06027
713/150

* cited by examiner

*Primary Examiner* — Fatoumata Traore
(74) *Attorney, Agent, or Firm* — Straub & Straub; Stephen T. Straub; Michael P. Straub

(57) ABSTRACT

Methods and apparatus for supporting secure packet communications, e.g., SRTP, which use implicit index numbers for synchronization and sequencing of received packets. The secure communications methods and apparatus having an adaptive index learning mode of operation and a non-adaptive index learning mode of operation. The adaptive index learning mode of operation being used to determine a correct estimated sequence number roll over counter number and the implicit index number for one of a plurality of secure packets received when an adaptive index learning process condition is satisfied.

20 Claims, 13 Drawing Sheets

| FIGURE 7A |
| FIGURE 7B |
| FIGURE 7C |

METHODS AND APPARATUS FOR SYNCHRONIZING DECRYPTION STATE WITH REMOTE ENCRYPTION STATE

RELATED APPLICATIONS

The present application is a continuation of U.S. patent application Ser. No. 14/841,276 filed on Aug. 31, 2015 which claims the benefit of U.S. Provisional Patent Application Ser. No. 62/121,287, which was filed on Feb. 26, 2015, both of which are hereby expressly incorporated by reference in their entirety.

FIELD

Apparatus and methods for synchronizing decryption state information with remote encryption state information for use with secure communication protocols.

BACKGROUND

In some secure communication protocols, not all parameters necessary for packet decryption are transmitted along with the packets. For example, in the secure real-time transport protocol (SRTP) as described in the Internet Engineering Task Force and the Internet Society, Request for Comment (RFC) 3711 entitled, "The Secure Real Time Transport Protocol," the roll-over-count (ROC) parameter of the sequence number (SEQ) is not transmitted by the encryption device to the decryption device for each packet. To properly decrypt each SRTP packet received, the decryption device must correctly estimate the ROC that was used when the packet was encrypted.

While in many scenarios estimating the ROC isn't too difficult (see for example, the explanation of how to estimate ROC for SRTP received messages provided in RFC 3711, section 3.3.1), there are a number of other scenarios where estimating the correct ROC to use for a given received packet is very complicated and can often result in the loss of ROC/SEQ synchronization when the estimated ROC value does not match the actual ROC value for the received packet. For example, in some cases where there is a redundant configuration such as in the case where an active server is processing many thousands of Voice Over Internet (VOIP) secure calls being streamed using SRTP and the active server is backed up by a standby server that is to take over processing the calls if the active server partially or fully fails, some per call states, such as ROC/SEQ needs to be mirrored frequently from the active server to the standby server for each of the many thousands of secure calls being processed by the active server. If the mirroring isn't done sufficiently well, the standby server will not be able to maintain every secure call after it takes over. Other exemplary scenarios that are complicated from the perspective of estimating the ROC/SEQ are scenarios wherein SRTP is used for streaming secure calls and a call is placed on hold and then resumed or a re-invite sequence is sent. In some of these scenarios, the decryption device receiving the packets can get out of sync with the encryption side resulting in lost or one-way audio after the caller tries to resume the call such as after the call had been placed on hold.

Maintaining ROC/SEQ synchronization between encrypting devices and decrypting devices is especially challenging where active and standby servers are used and complex and frequent mirroring of estimated ROC/SEQ values is required. In such instances when the synchronization is lost due to an incorrect ROC estimated value the consequences can be severe such as for example the loss of an active call.

In view of the above, there is a need for new methods and apparatus for maintaining decryption state information such as for example, ROC parameter of the cryptographic context of an SRTP stream, with remote encryption state information for use with secure communication protocols such as for example SRTP.

SUMMARY

Various embodiments are directed to supporting confidentiality and authentication of media streams using secure communications, e.g., Secure Real-time Transport Protocol with implicit index sequence numbers.

Methods and apparatus for supporting secure packet communications, e.g., SRTP, which use implicit index numbers for synchronization and sequencing of received packets. The secure communications methods and apparatus having an adaptive index learning mode of operation and a non-adaptive index learning mode of operation. The adaptive index learning mode of operation being used to determine a correct estimated sequence number roll over counter number and the implicit index number for one of a plurality of secure packets received when an adaptive index learning process condition is satisfied.

In one embodiment of the secure communications method of the present invention, a decrypting device performs the steps of receiving signaling information such as for example call signaling information that a VOIP call that has been on hold is resuming, receiving a plurality of encrypted secure real time packets, said plurality of packets being a part of a secure real time packet stream, said secure real time packet stream using an implicit packet index for sequencing of packets in said secure real time packet stream, said implicit packet index being generated from a sequence number and a sequence number roll over counter number, said sequence number for each of said plurality of packets being included in each of said packets, said roll over counter number for each of said plurality of packets not being included with said packets; determining, based at least in part on the received signaling information, whether an adaptive index learning process condition is satisfied for the secure real time packet stream; and storing in memory an indication that the adaptive index learning process condition is satisfied when said determination is that said condition is satisfied; when said adaptive index learning process condition is satisfied using an adaptive index learning process to determine a correct estimated sequence number roll over counter number for one of said plurality of received packets; and after determining said correct estimated sequence number roll over counter number for one of said plurality of received packets storing in said memory an indication that said adaptive index learning process condition is no longer satisfied.

In some but not all embodiments of the present invention, the adaptive index learning process includes the steps of setting an estimated sequence number roll over counter number to zero after a determination that said adaptive index learning process condition is satisfied for the secure real time packet stream; performing an authentication test on one or more of the received packets received using said estimated roll over counter sequence number; and when said authentication test fails discarding each packet which fails the authentication test and incrementing said estimated roll over counter sequence number after a predetermined number of received packets fail said authentication test, and when said authentication test passes accepting said packet as being valid. In some embodiments the predetermined number is configurable and is stored in memory.

In some embodiments the adaptive index learning process includes the steps of setting a plurality of estimated sequence number roll over counter numbers to different values after a determination that said adaptive index learning process condition is satisfied for the secure real time packet stream; performing a plurality of authentication tests on a packet received after said determination that said adaptive index learning process condition is satisfied for the secure real time packet stream using said plurality of estimated roll over counter sequence numbers, said packet being one of said plurality of encrypted secure real time packets; and when all of said plurality of authentication tests fail discarding said packet and when one of said authentication test passes accepting said packet as being valid and storing the estimated sequence number roll over counter number used in the authenticate test that passed in memory as the correct estimated sequence number roll over counter number.

In some embodiments of the method of the present invention, the signaling information includes at least one of the following: session control signaling information, call flow signaling information or decryption device status signaling information.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 9:
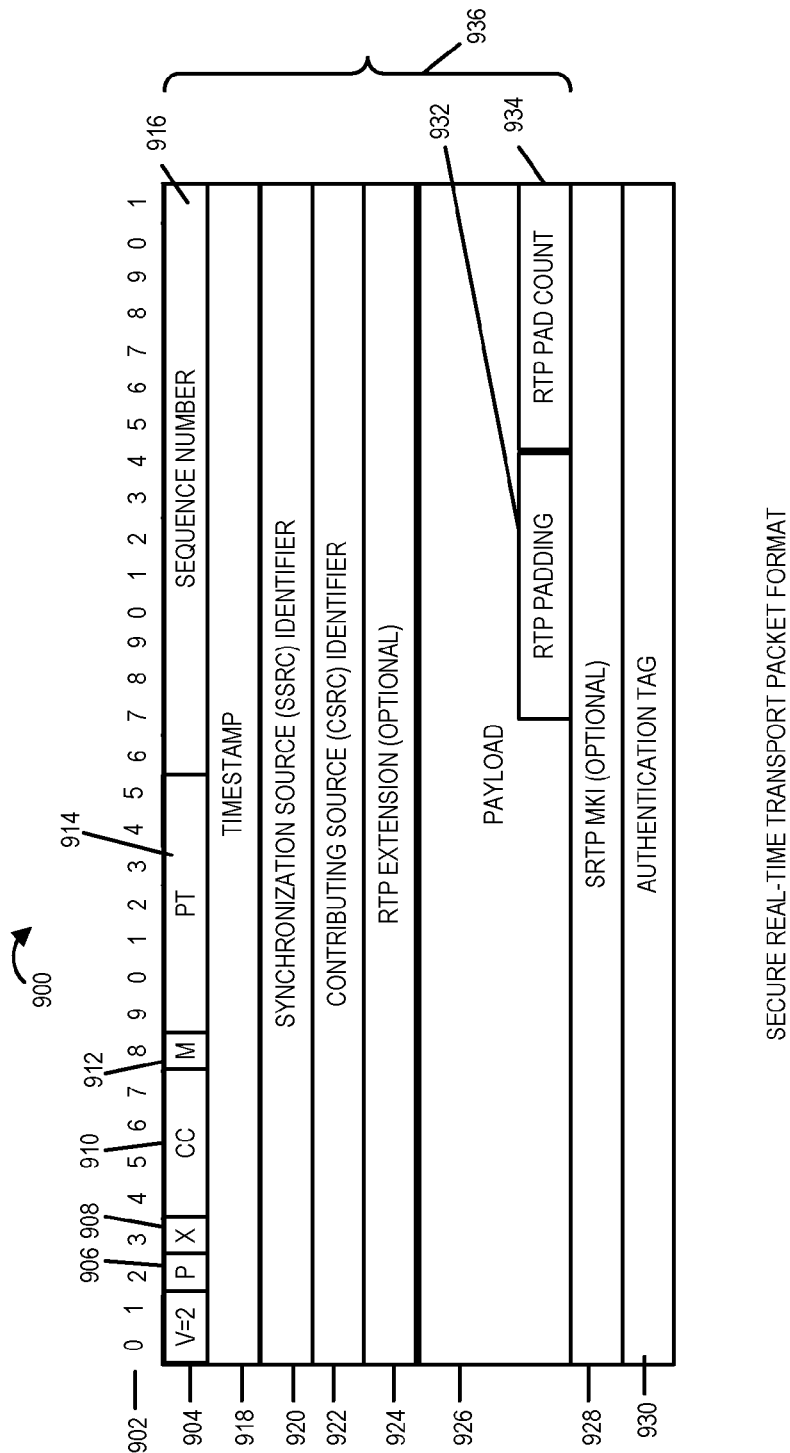
FIG. 9 is a drawing illustrating the format of an exemplary secure real-time transport packet in accordance with an exemplary embodiment.

The present invention relates to methods and apparatus for synchronizing decryption state information with remote encryption state information. In an exemplary embodiment of the present invention Secure Real-time Transport Protocol (SRTP) is used for providing secure communication calls such as Voice Over Internet IP calls. Use of the SRTP protocol provides the ability to provide confidentiality, message authentication, and replay protection to the Real-time Transport Protocol (RTP) traffic and to the control traffic for the RTP, Real-time Transport Control Protocol. Request For Comment (RFC) 3711 is a document that describes the SRTP protocol. SRTP provides a framework for encryption and message authentication and is able to achieve high throughput and low packet expansion. SRTP is able to achieve high throughput in part because it uses a keyed-hash based function for message authentication and an implicit index for sequencing/synchronization based on the RTP sequence number for SRTP. FIG. 9 illustrates the format of an exemplary SRTP packet.

For each SRTP stream the sender and the receiver of the SRTP packets need to maintain cryptographic state information. This cryptographic state information is referred to as the SRTP packet streams cryptographic context. Included among a SRTP packet streams cryptographic context are session keys, master keys and transform-independent parameters which are independent of the particular encryption or authentication transforms used. The transform-independent parameters of the cryptographic context for an SRTP stream include: a 32-bit unsigned rollover counter (ROC), which records how many times the 16-bit RTP sequence number has been rest to zero after passing through 65,535. Unlike the sequence number (SEQ) which is included in the SRTP packet header (see FIG. 9 916 SRTP sequence number), the ROC is maintained locally by both the transmitter and the receiver. A SRTP packet's index corresponding to a given ROC and SRTP sequence number is the 48 bit quantity generated in accordance with the equation $i=2^{16}*ROC+SEQ$, where i represents the index, ROC represents the rollover counter value and SEQ represents the sequence number. This index number or value is sometimes referred to herein as the index sequence number of the SRTP packet. For receivers of SRTP packet streams, the cryptographic context also includes a 16-bit sequence number $s\_1$ which is thought of as the highest received SRTP sequence number.

Also included among the cryptographic context is an identifier for the encryption algorithm, an identifier for the message authentication algorithm, a replay list, maintained by the receiver containing indices of recently received and authenticated SRTP packets, and a master salt, to be used in the key derivation of session keys. Additional details of the cryptographic context state information maintained, e.g., stored in memory, by the encrypting and decrypting devices can be found in the RFC 3711.

The cryptographic context for an SRTP packet is uniquely identified by a context identifier which includes the SSRC, the destination network address and the destination transport number where the destination network address and the destination transport port are included as part of an SRTP packet for the packet stream. When provided with this three part identifier the key management returns a cryptographic context with the information previously described.

Figure 1:
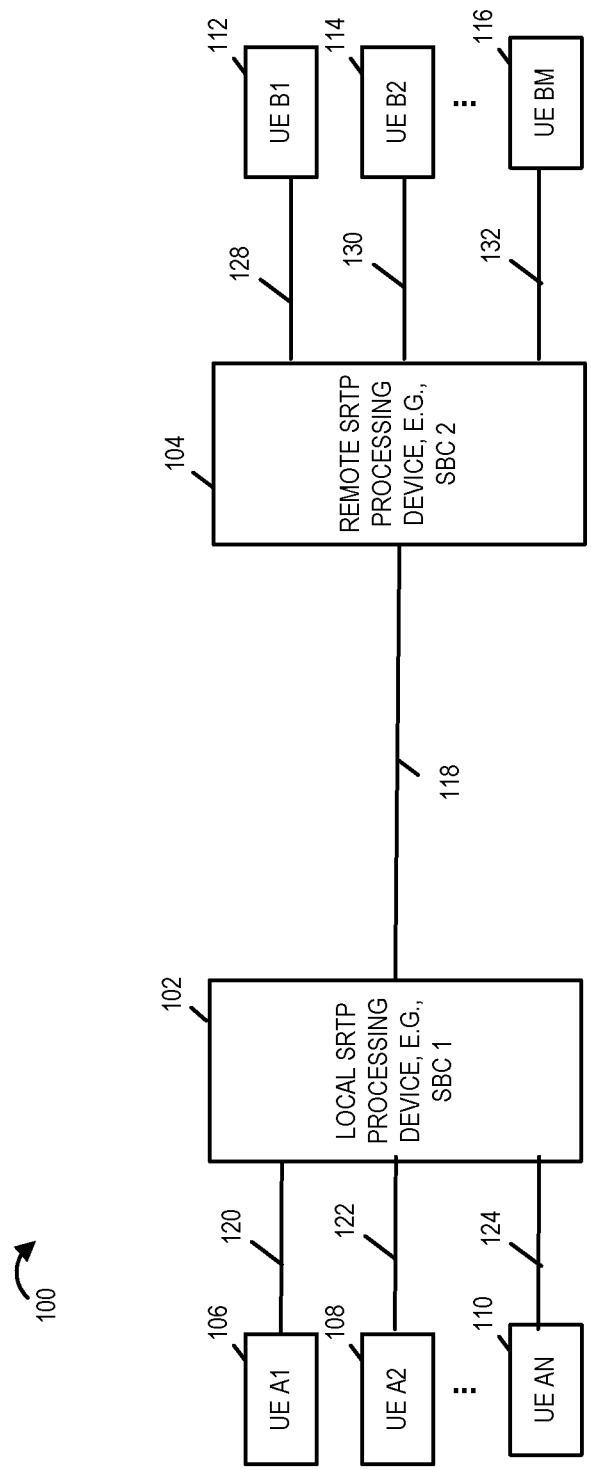
FIG. 1 is a drawing illustrating an exemplary communications system in accordance with an exemplary embodiment.

FIG. 1 is a drawing illustrating an exemplary communications system in accordance with an exemplary embodiment of the present invention. System 100 of FIG. 1 includes a local SRTP processing device 102, e.g., a Session Border Controller 1, a remote SRTP processing device 104, e.g., a Session Border Controller 2. The exemplary SRTP processing devices process secure real-time transport packets. FIG. 9 illustrates the format for an exemplary secure real-time transport packet (SRTP packet) in accordance with one embodiment of the present invention. An exemplary Session Border Controller that may be, and in some embodiments is, used for Session Border Controller 1 and/or Session Border Controller 2 is shown in further detail in FIG. 4. User devices UE A1 106, UE A2 108, . . . , UE AN 110 are coupled to the local SRTP processing device 102 via communication links 120, 122, . . . , 124 respectively. User devices UE B1 112, UE B2 114, . . . , UE BM 116 are coupled to the remote SRTP processing device 104 via communications links 128, 130, . . . , 132 respectively. Each of the user devices include one or more applications and/or modules for establishing one or more Voice Over Internet Protocol calls via SIP sessions and using SRTP streams. The local SRTP processing device 102 is coupled to the remote SRTP processing device 104 via communications link 118. The communications link 118 supports the transmission of multiple VOIP secure calls using SRTP streams. For example, many thousands of secure calls may be, and in some embodiments are, transmitted simultaneously between the local SRTP processing device 102 and the remote processing device 104 when calls are established between the user devices coupled to the local SRTP processing device, e.g., UE A1 106, UE A2 108, . . . , UE AN 110 and the user devices coupled to the remote SRTP processing device 104, e.g., UE B1 112, B2 114, UE BM 116. For each SRTP stream established to carry VOIP call traffic between the local SRTP processing device 102 and the remote SRTP processing device 104 a cryptographic context is maintained, e.g., stored in memory, at both the local SRTP processing device 102 and the remote SRTP processing device 104. The cryptographic context includes state information including a roll over counter (ROC) value that is estimated by the SRTP processing device that is receiving the SRTP packets of the SRTP stream.

Figure 2:
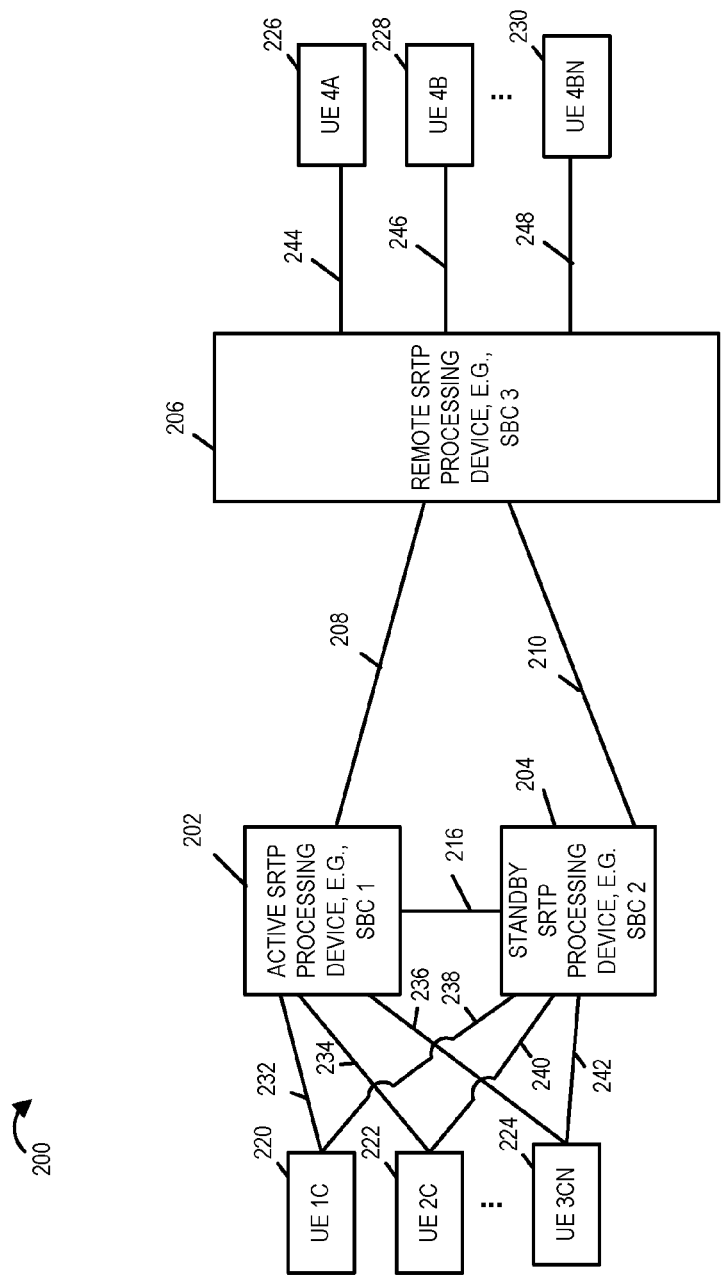
FIG. 2 is a drawing illustrating an exemplary communications system in accordance with an exemplary embodiment.

FIG. 2 is a drawing illustrating an exemplary communications system 200 in accordance with an exemplary embodiment. System 200 includes active SRTP processing device 202, e.g., a Session Border Controller (SBC 1), a standby or backup SRTP processing device 204, e.g., a Session Border Controller (SBC 2), user equipment UE 1C 220, UE 2C 222, . . . , UC3CN 224 coupled to both the active SRTP processing device 202 and the standby SRTP processing device 204. UE 1C 220, UE 2C 222, . . . , UE 3CN 224 are coupled to the active SRTP processing device via communications links 232, 234, . . . , 236 respectively. UE 1C 220, UE2C 222, . . . , UE 3CN 224 are coupled to the standby SRTP processing device 204 via communications links 238, 240, . . . , 242 respectively. A remote SRTP processing device, e.g., SBC 3, is coupled via communications links 244, 246, . . . , 248 to user devices UE 4A 226, UE 4B, 228, . . . , UE 4BN 230. The remote SRTP processing device 206 is coupled to the active SRTP processing device 202 and the standby SRTP processing device 204 via communication links 208 and 210 respectively. The active SRTP processing device 202, standby SRTP processing device 204 and remote SRTP processing device 206 may be, and in some embodiments are, implemented as or to include the features of the exemplary Session Border Controller shown in FIG. 4 and described in detail below. Communications link 216 couples the active SRTP processing device 202 to the Standby SRTP processing device 204. In the exemplary embodiment of FIG. 2 the user devices include VOIP secure call applications and/or modules that allow each user device to establish one or more secure VOIP calls using SRTP streams to transmit the call.

A description of an exemplary method of operation of the system 200 for providing secure communications with standby redundancy is now provided. The user devices, active, standby and remote SRTP processing devices are capable and configured to establish and/or support VOIP calls and call traffic using SRTP streams. The user devices, active, standby and remote SRTP processing devices are capable and configured to establish and receive SRTP streams carrying VOIP traffic. The active SRTP processing device 202 receives one or more SRTP streams corresponding to one or more VOIP calls from the remote SRTP processing over communications link 208. For example, the active SRTP processing device may, and in some embodiments does, receive tens of thousands of SRTP streams corresponding to tens of thousands of VOIP calls. For each of the received SRTP streams a cryptographic context is stored in memory at the remote SRTP processing device 206 which transmitted the SRTP packets in the stream and at the Active SRTP processing device 202 which received the SRTP packets in the stream. The cryptographic context being associated with its corresponding SRTP in memory. Additionally, some of but not all of the cryptographic context information for each of the SRTP streams received at the Active SRTP processing device 202 is mirrored to the Standby SRTP processing device 204. The mirroring may, and in some embodiments does, occur by the Active SRTP processing device 202 transmitting to the Standby SRTP processing device 204 the cryptographic context information to be mirrored for each received SRTP stream. When the Active SRTP processing device fails either partially or completely, the Standby processing device beings receiving SRTP streams previously being handled by the Active SRTP processing device from the remote SRTP processing device 206 over communications link 210. The Standby SRTP processing device 204 receives signaling information such a status indication that the Active SRTP processing device has partially or completely failed such as for example an active SRTP processing device health status message sent either by the active SRTP process device over communication link 216 or a message from the remote SRTP processing device 206 sent over communications link 210. The Standby SRTP processing device 204 then uses the method 700 disclosed in FIG. 7 to determine the correct ROC for each of the SRTP streams it begins processing. The Active SRTP processing device health status message indicating a failure of the Active SRTP processing device 202 upon receipt by the standby processing device 204 will be determined to be a signal that an adapt flag setting condition has been met for all SRTP streams that the standby SRTP processing device is now receiving as a result of the switchover from the active SRTP processing device to the Standby SRTP processing device. In some instances, a heartbeat signal sent by the Active SRTP device is monitored by the Standby SRTP processing device 204 and when the heartbeat signal is not received after a predetermined amount of time a switchover of the receipt and processing of SRTP streams occurs from the Active to the Standby SRTP processing device. In such an embodiment, the failure to receive the heartbeat signal is considered a signaling information that the adapt flag setting condition has been met for all SRTP streams being switched over to the standby SRTP processing device 204 from the Active SRTP processing device 202.

Figure 3:
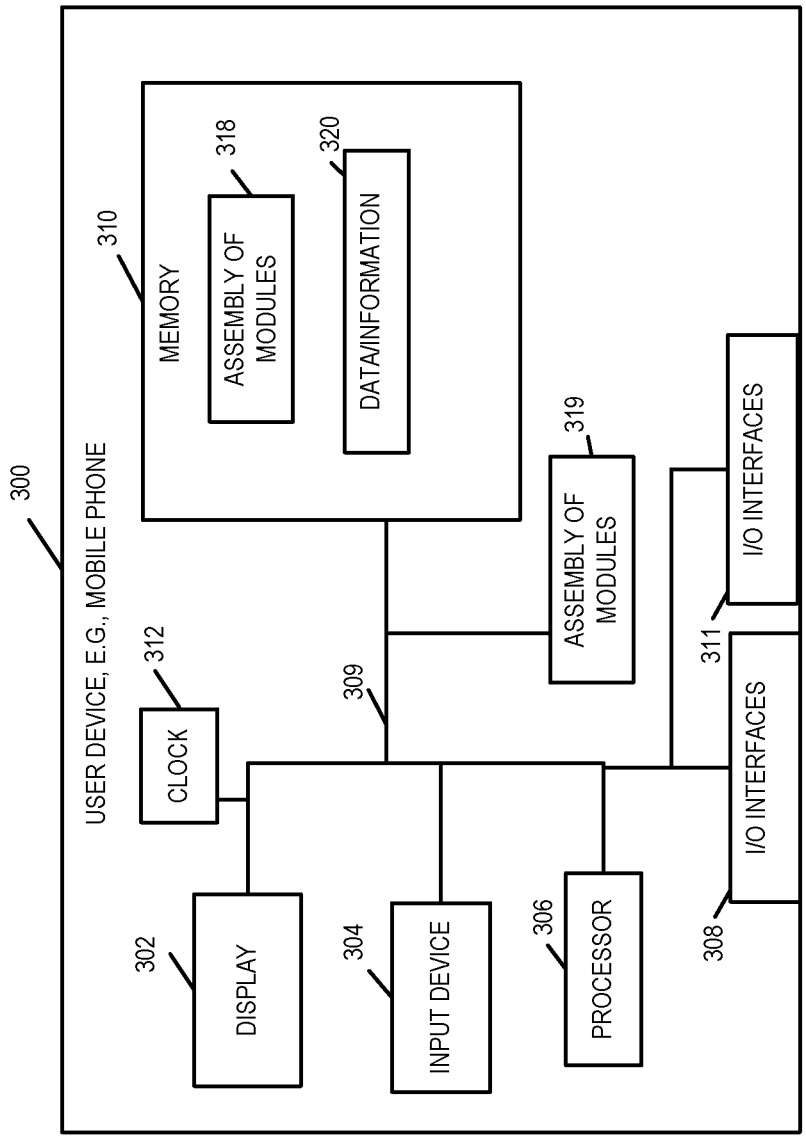
FIG. 3 is a drawing of an exemplary user equipment in accordance with an exemplary embodiment.

FIG. 3 is a drawing of an exemplary user equipment such as a mobile phone in accordance with an exemplary embodiment. Exemplary user device 300 includes a display 302, an input device 304 such a keypad or touch screen, a processor 306, e.g., a CPU, I/O interfaces 308 and 311 which include receivers and transmitters, which couple the user device to various devices and networks, memory 310, a clock 312, and an assembly of modules 319, e.g., circuits corresponding to different modules, coupled together via a bus 309 over which the various elements may interchange data and information. Memory 310 includes an assembly of modules 318, e.g., an assembly of software modules, and data/information 320. The assembly of modules 319 and/or 318 include modules for establishing and receiving secure VOIP calls using secure real-time transport protocol. The exemplary user devices shown in systems 100, 200, and 800 of FIGS. 1, 2, and 8 respectively are in some embodiments implemented as the user device 300 of FIG. 3. The exemplary user device 300 may, and in some embodiments is, implemented as a laptop, smartphone, computer, tablet, or other communications device.

Figure 4:
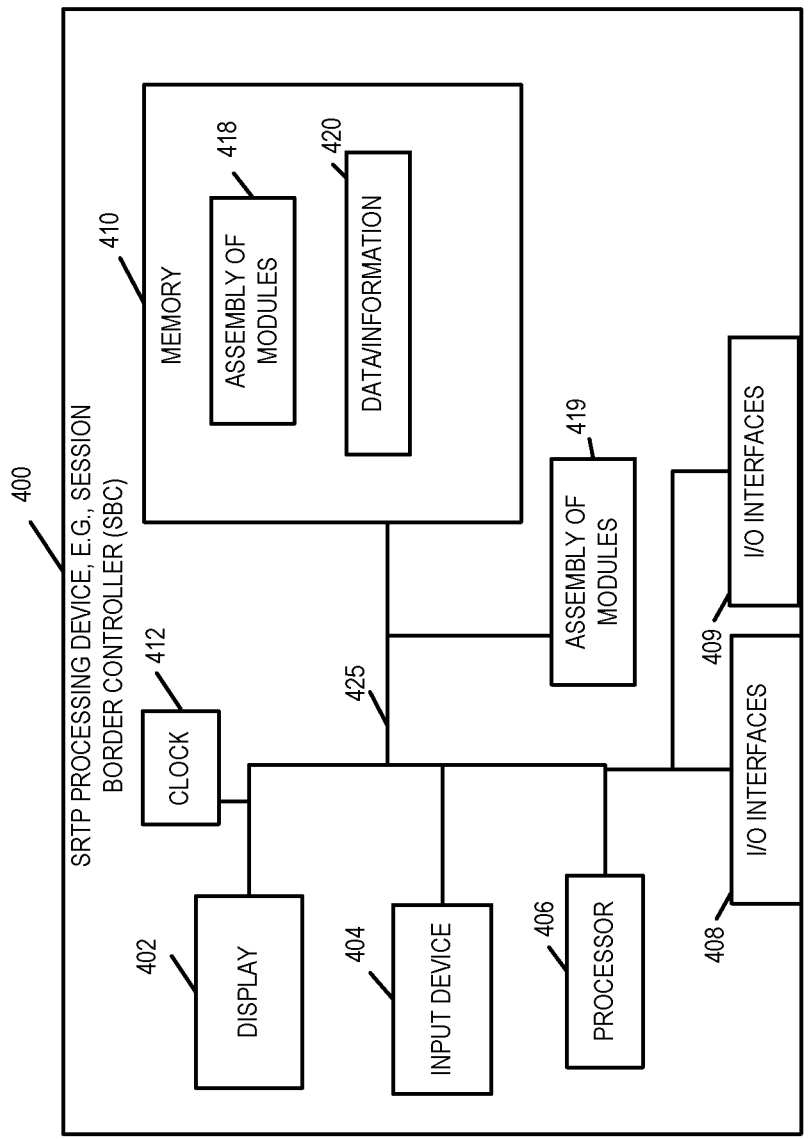
FIG. 4 is a drawing of an exemplary session border controller implemented in accordance with an exemplary embodiment.

FIG. 4 is a drawing of an exemplary SRTP processing device which is shown as an exemplary session border controller (SBC) implemented in accordance with an exemplary embodiment. Exemplary session border controller 400 includes a display 402, an input device 404, a processor 406, e.g., a CPU, I/O interfaces 408, which couple the SBC to various devices including user equipment such as UE A1, UE A2 and UE A3, I/O interfaces 408 and 409, which couple the SBC to a core network or another device, memory 410, a clock 412, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420. The clock 412 is used for timing related operations including, e.g., in performing tests on timestamp field values in a received packet being processed.

FIG. 9 illustrates the format of an exemplary secure real-time transport packet 900. The label 902 identifies numbers which are not part of the secure real-time transport packet but are shown to illustrate the location of bits in the packet. The SRTP packet includes fields for a sequence number 916 which is incremented by one for each SRTP packet sent and is to used by the receiver to detect packet loss and restoring the packet sequence, a timestamp 918 which is used by the receiver to play back the received samples at appropriate intervals, a synchronization source (SSRC) identifier 920 uniquely identifies the source of the stream, a contributing source (CSRC) identifier 922 identifies sources that have contributed to a stream which has been generated from multiple sources, an optional RTP extension 924, a payload 926 which is encrypted, an optional SRTP Master Key Index (MM) 928, and an authentication tag 930. The payload may, and in some embodiments does, include RTP padding 932 and a RTP pad count 934. The label 936 indicates the authenticated portion of the SRTP packet. The authentication tag is used to carry message authentication data and consists of the RTP header followed by the encrypted portion of the SRTP packet. Encryption is applied before authentication by the sender of the SRTP packet and authentication is applied before decryption by the receiver of the packet. The secure real-time transport packet also includes fields V 904 which indicates the version of the protocol in this example 2, P 906 which is a padding bit that when set indicates RTP padding is used, X 908 which is an extension bit that indicates whether there is RTP extension, CC 910 which is CSRC count which contains the number of CSRC identifiers, M 912 which is a marker that when set informs an application that the data has special relevance to the application, and PT 914 which is a field indicating the payload type.

Figures 7, 7A:
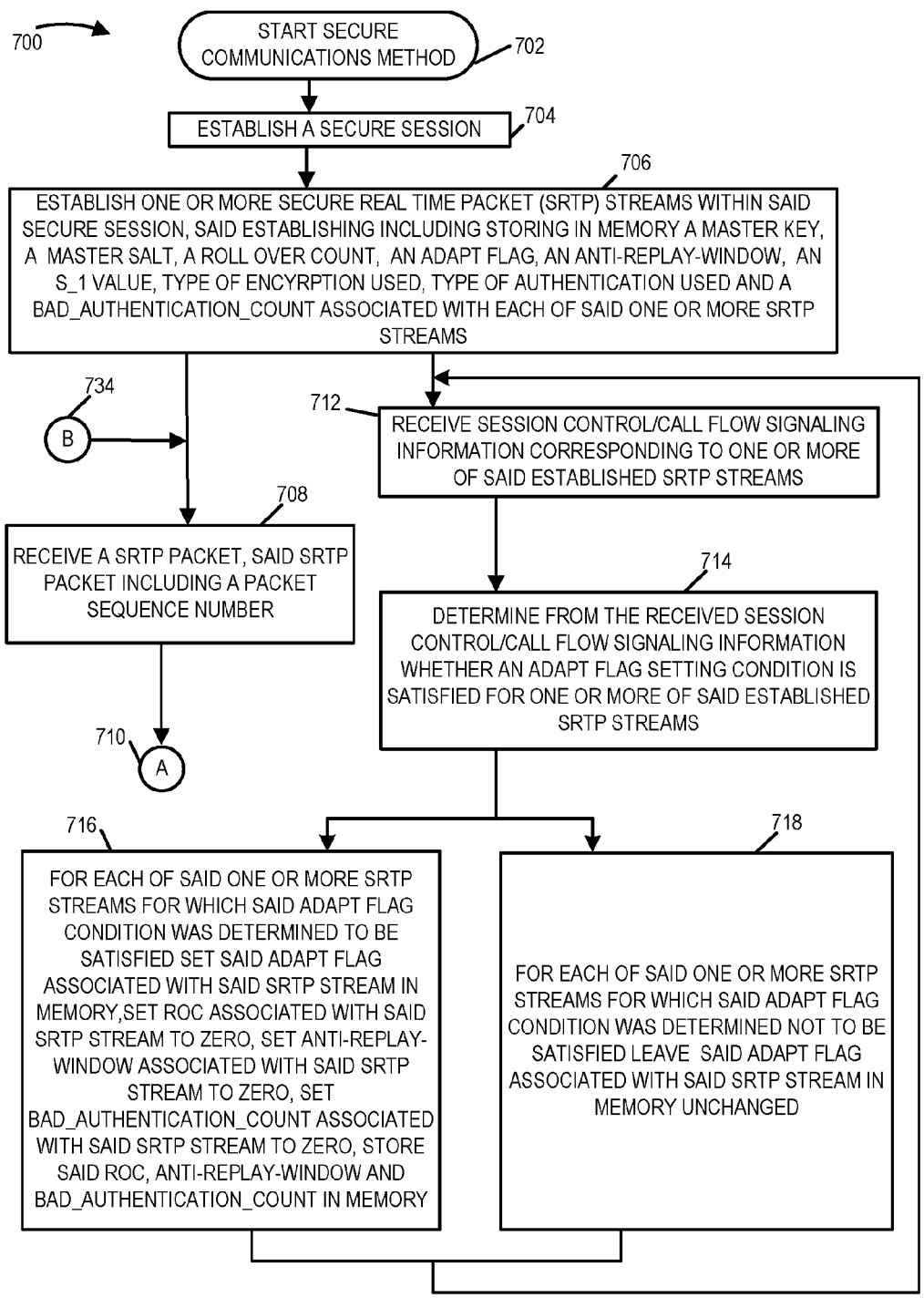
FIG. 7 comprises FIGS. 7A, 7B, and 7C.
FIG. 7A is a first part of a flowchart of an exemplary secure communications method in accordance with an exemplary embodiment.
Figure 7B:
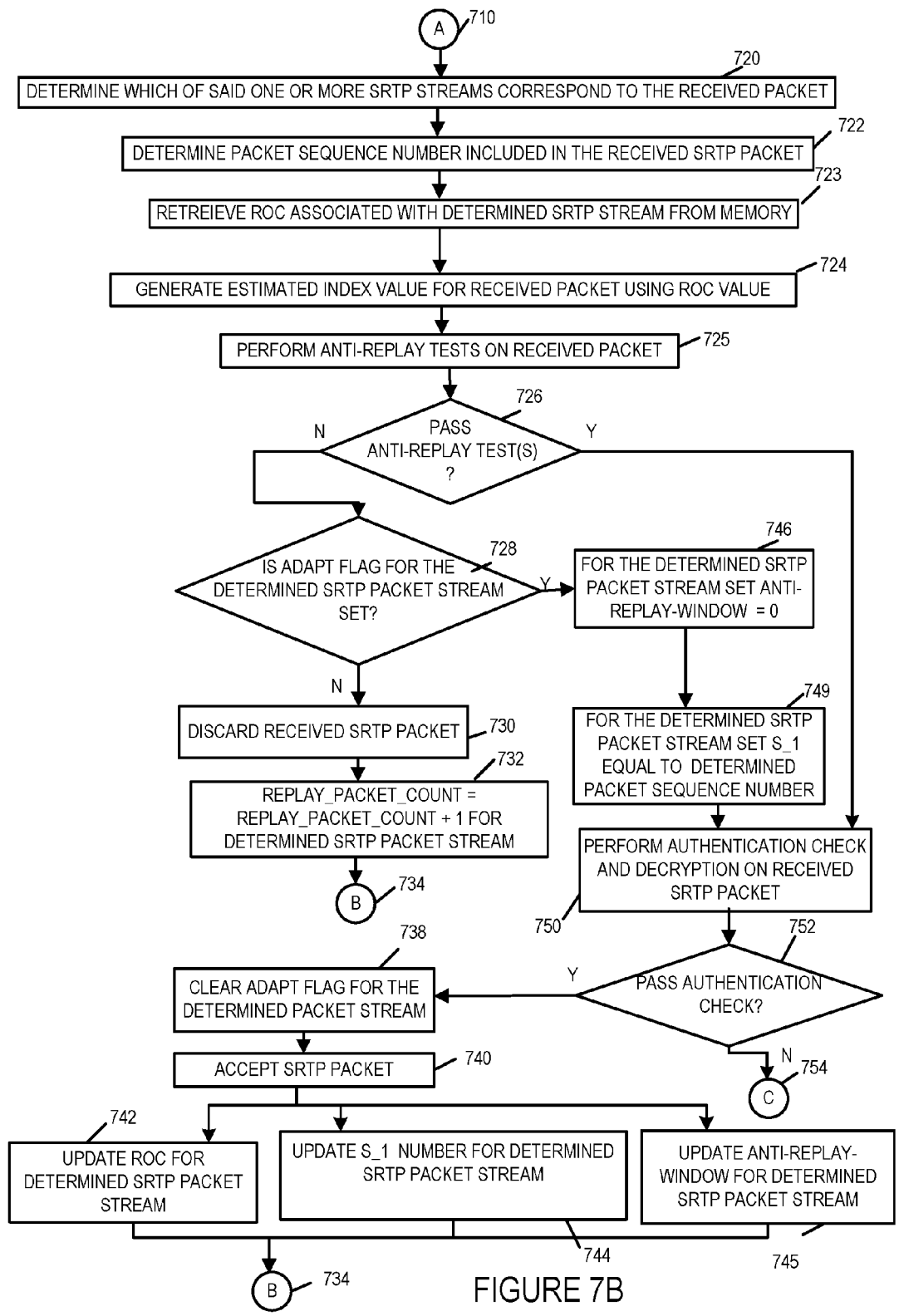
FIG. 7B is a second part of a flowchart of an exemplary communications method in accordance with an exemplary embodiment.
Figure 7C:
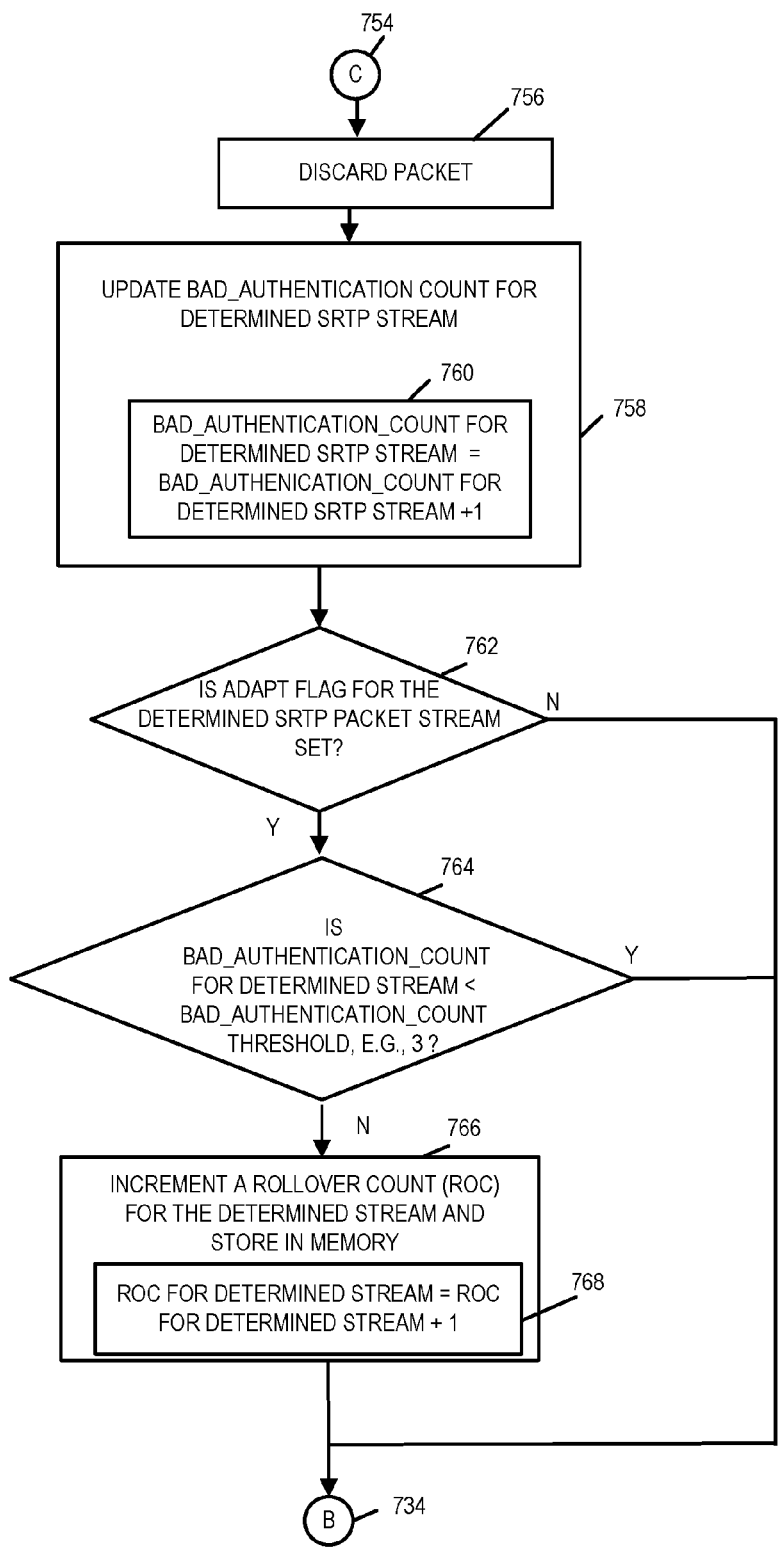
FIG. 7C is a third part of a flowchart of an exemplary communications method in accordance with an exemplary embodiment.

FIG. 7, comprising the combination of FIG. 7A, FIG. 7B and FIG. 7C, is a flowchart 700 of an exemplary communications method in accordance with an exemplary embodiment. The exemplary method of flowchart 700 may be, and sometimes is, performed by an exemplary secure real time packet processing device such as for example a session border controller (SBC) 400 of FIG. 4, SBC 1 808 of FIG. 8, Active SRTP processing device 202 and/or Standby SRTP processing device 204 of FIG. 2 implemented in accordance with an exemplary embodiment.

Operation starts in start step 702 and proceeds to step 704, in which the session border controller establishes a secure session. In some embodiments, module configured to establish a secure session 504 performs this step of the method. Operation proceeds from step 704 to step 706 wherein the session border controller establishes one or more secure real time packet (SRTP) streams within said secure session established in step 704. In some embodiments, as part of the establishing step 706 the Session Border Control stores in memory, e.g., data/information section 420 of memory 410, cryptographic context information and other information/data associated with each of said one or more established streams including a master key 626 to be used for decrypting, a master salt value 628 to be used in the key derivation of session keys, a replay_packet_count, a sequence index number roll over count 624 sometimes referred to as a roll over count, roll over counter or ROC, an adapt flag, an anti-replay list 636, an anti-replay-window 638, a s−1 value 625, type of authentication used 634, a bad_authentication-_count 620, a bad_authentication_count threshold 640, the type of encryption used 632, associated with each of said one or more secure real time streams that is established. In some embodiments, step 706 is performed by sub-module 508 and its sub-modules 510, 512, 514, 516, 518, 520, 522, 524, 526. Operation proceeds from step 706 to steps 708 and 712.

In step 708, the session border controller receives a packet, e.g., a session real time protocol packet (SRTP), via one of its I/O Interfaces 408 or 409. The received SRTP packet includes a sequence number (SEQ), e.g., a 16 bit number. See for example sequence number field 916 of SRTP packet 900. This sequence number which is included in the packet is used in combination with a sequence number roll over count (ROC) maintained by the Session Border Controller to determine the packet index of the received SRTP packet in the established packet stream. As explained in the Request for Comments 3711 entitled: "The Secure Real-time Transport Protocol", implementations of the Secure Real-time Transport Protocol use an implicit packet index for sequencing of received packets of a packet stream. The index is referred to as implicit because not all of the index is explicitly carried in the SRTP packet. The roll over count of the sequence number is not carried in the SRTP packet. The index is generated by the equation $i=2^{16}*ROC+SEQ$. Where "i" is the index, ROC is the roll over count and SEQ is the 16 bit sequence number received as part of the packet. Operation proceeds from step 708 via connection node A 710 to determination step 720 shown on FIG. 7B. In some embodiments step 708 is performed by module 540. In some embodiments step 708 is performed by one of the Input/Output interfaces of the Session Border Controller which includes one or more receivers.

In determination step 720, the Session Border Controller makes a determination as to which of said one or more SRTP streams correspond to the received packet. In some embodiments, this step is performed by determination module 542. In some embodiments, this step is performed by determination module 544. Operation then proceeds to from step 720 to step 722. In step 722, the packet sequence number (SEQ) included in the received SRTP packet is determined, e.g., by extracting the SEQ value from the received packet. In some embodiments, step 722 is performed by module 546. Operation proceeds from step 722 to step 723.

In step 723, the ROC value which at this stage of the processing is an estimated ROC value associated with the determined SRTP stream is retrieved from memory. In some embodiments, step 723 is performed by retrieval module 548 and in some embodiments sub-module 550. Operation proceeds from step 723 to step 724.

In step 724, the Session Border Controller generates an estimated index value for the received packet using the retrieved ROC value. In some embodiments, step 724 is performed by index sequence number generating module 552. Operation proceeds from step 724 to step 725.

In step 725 one or more anti-replay tests are performed on the received packet. In some embodiments, step 724 is performed by module 554. Operation proceeds from step 725 to decision step 726.

In decision step 726, if the packet passed the one or more anti-replay tests operation proceeds from step 726 to step 750 otherwise operation proceeds to decision step 728. In some embodiments decision step 726 is performed by pass anti-replay test(s) decision module 556.

Returning to step 712, session control/call flow signaling information corresponding to one or more of said established SRTP streams is received via one of the Session Border Controller's I/O interfaces 408 or 409. In some embodiments step 712 is performed by module 528. In some embodiments, the session control/call flow signaling information is a signaling indicating a switchover of the packet stream's processing from an active SBC to a standby SBC. In some embodiments, the session control/call flow signaling information is a request to change an encryption key. In some embodiments, the session control/call flow signaling information is a signal indicating that a call that has been on hold is resuming the SRTP stream communicating the media for the call. Operation proceeds from step 712 to determination step 714.

In determination step 714, the received session control/call flow signaling information is analyzed to determine whether an adapt flag setting condition is satisfied for one or more of the SRTP streams established in step 706. In some embodiments, step 714 is performed by module 530. In some embodiments one or more of the satisfies the adapt flag setting condition for a SRTP stream: a received signal indicating a switchover of the packet stream's processing from an active SBC to a standby SBC, the standby SBC being a recipient of packets from the SRTP packet stream; a session control/call flow signal that is a request to change an encryption key; a signal indicating that a call that has been on hold is resuming the SRTP stream communicating the media for the call. Operation proceeds from step 714 to steps 716 and 718. Steps 716 and 718 may be performed in parallel or sequentially.

In step 716 an adapt flag is set in memory, e.g., data/information section 420 of memory 410, for each of the one or more SRTP streams for which an adapt flag condition was determined to be satisfied. Each of the adapt flags being associated in memory with a corresponding SRTP stream. In some embodiments, the adapt flag may be implemented as a one bit register. Setting of the adapt flag may be achieved by writing the value "1" to the register. In addition in step 716 the estimated ROC associated with said SRTP stream is set to zero, the anti-replay-window associated with the SRTP stream is set to zero, the bad_authentication_count associated with said SRTP stream is set to zero and the ROC, anti-replay-window and bad_authentication_count parameters are stored in memory. In some embodiments, step 716 is performed by module 532. In some embodiments module 532 has sub-modules 534, 536 and 538 that perform some of the operations of step 716.

In step 718, for each of the one or more SRTP streams for which said adapt flag condition was determined not to be satisfied the adapt flag associated with each of these SRTP streams is left unchanged in memory, e.g., data/section memory 420 of memory 410. In some embodiments, during the step of establishing a SRTP stream a memory location is reserved in memory for use as an adapt flag which corresponds to the SRTP stream being established. In some embodiments, the adapt flag is cleared or set to a value of zero when it is initialized. Operation proceeds from step 716 and step 718 back to step 712 where additional session/call control flow signaling information corresponding to one or more of the established SRTP streams is received and is processed. The steps 712, 714, 716 and 718 forming a continuous loop for the receiving and processing of session control/call flow signaling information. In some embodiments, the established SRTP stream communicates data for a Voice Over Internet Protocol (VOIP) call. In some of such embodiments, call signaling information indicating that the VOIP call associated with the SRTP stream has been modified, e.g., the call state being modified from an on hold state to a call active state, is a condition that would satisfy the adapt flag setting condition of step 714 and would result in a determination that the adapt flag associated with or corresponding to the SRTP stream carrying the VOIP data is to be set. Setting of the adapt flag associated with a SRTP stream results in the method entering into an index adaptive learning mode for the processing of received packets on the associated SRTP stream. Other conditions that satisfy the adapt flag setting condition are a session control/call control signal indicating that a switchover has occurred from an active session border control to a standby session border control with the packet receiving session border controller being the standby session border controller. In such a case all SRTP streams affected by the switchover have their corresponding adapt flags set. In some embodiments, call session control and/or call flow signaling indicating that a secure call is being setup is a condition sufficient to satisfy the adapt flag setting condition being satisfied. In some embodiments, the adapt condition is satisfied when the session control signal includes a re-invite request.

Returning to decision step 728, in decision step 728 a decision is made that if the adapt flag for, corresponding to, or associated with the determined SRTP packet stream is set then operation proceeds to step 746 otherwise operation proceeds to step 730. In some embodiments, decision step 728 is performed by decision module 558.

In step 730 the received SRTP packet is discarded by Session Border Controller and operation proceeds to step 732. In some embodiments, discard step 730 is performed by discard received SRTP packet module 560.

In step 732 the replay_packet_count is incremented for the determined SRTP packet stream and then the operation proceeds to step 708 via connection node B 734 where another SRTP packet is received for processing by the Session Border Controller via one of the Input/Output Interfaces 408 or 409. In some embodiments, step 732 is performed by replay_packet_count increment module 562.

When the adapt flag for, corresponding to or associated with the determined SRTP packet stream is set as previously discussed operation proceeds from decision step 728 to processing step 746. In step 746, the anti-replay window is set to zero. In some embodiments, step 746 is performed by module 564. Operation proceeds from step 746 to step 749.

In step 749, the s_1 for the determined SRTP packet stream is set equal to the determined packet sequence number for the received SRTP packet. In some embodiments step 749 is performed by module 565. Operation then proceeds to step 750.

In step 750, the Session Border Controller performs an authentication check and decryption operation on the received SRTP packet using the estimated index number and estimated ROC number determined for the received SRTP packet. In some embodiments, step 750 is performed by module 566. In some embodiments only the authentication check is performed and the decryption of the packet is performed as a separate step once the packet has been accepted. In some embodiments the decryption is performed on the packet once the authentication check has been passed and the packet is only accept if the decryption is successfully performed.

Operation then proceeds from step 750 to decision step 752. In decision step 752 if the packet passed the authentication check performed in step 750, operation proceeds to set 738 otherwise operation proceeds to processing step 756 shown on FIG. 7C via connection node C 754. In some embodiments, decision step 752 is performed by decision module 568.

In step 756 the Session Border Controller discards the received packet and operation proceeds to step 758. In some embodiments, step 756 is performed by module 560. In step 758 the bad_authentication_count for the determined SRTP stream is updated. In some embodiments, step 758 includes sub-step 760 wherein bad_authentication_count for the determined SRTP stream is incremented. In some embodiments, step 758 is performed by module 580 and sub-step 760 is performed by module 582.

Operation proceeds from step 758 to decision step 762. In decision step 762 if the adapt flag for the determined SRTP stream is set, operation proceeds to decision step 764 otherwise operation proceeds to receive SRTP packet step 708 shown on FIG. 7A via connection node B 734 where the operation proceeds with the reception of another SRTP packet. In some embodiments, decisions step 762 is performed by decision module 558.

Returning to decision step 764, if the bad_authentication_count for the determined stream is not less than the bad_authentication_count threshold for the determined stream then operation proceeds to step 766 wherein the estimated rollover count (ROC) for the determined stream is incremented. In some embodiments step 766 includes sub-step 768 in which ROC for the determined stream=ROC for the determined stream+1. In some embodiments, step 764 is performed by decision module 586. In some embodiments, increment roll over count step 766 is performed by module 588.

Operation then proceeds from step 766 to receive step 708 on FIG. 7A via connection node B 734 where operation of the method continues on the next received SRTP packet. In step 764, if the bad_authentication_count for the determined stream is less than the bad_authentication_count threshold, e.g., a threshold value of 3, then operation proceeds to step 708 via connection node B 734 where the operation proceeds with the reception of another SRTP packet. In some embodiments, a bad_authentication_count threshold value of 3 is used so that the same estimated ROC is used on three packets before the ROC value is incremented. In this way, if the estimated ROC count was not the cause of the authentication failure but the failure was due to other problems, e.g., use of an improper master key resulting from the sender not properly updating the key information, by not incrementing the ROC value the method will be able to lock onto the correct ROC value quicker assuming the keydata is updated before the bad_authentication_count threshold is exceeded. In some cases the bad_authentication_count threshold is set to zero so that the estimated ROC value is incremented after each authentication packet failure. In some embodiments, the bad_authentication_count is tested against a second bad_authentication_count threshold value and when the bad_authentication_count exceeds the second threshold value one of the following operations is taken by the Session Border Controller in connection with SRTP stream: the determined SRTP stream is re-established, a request for new key information is made, the ROC value is reset to zero, or the adapt flag is cleared and the adaptive index learning mode is exited.

Returning now to decision step 752, when the authentication check on the received SRTP packet is passed operation proceeds to processing step 738. In step 738, the adapt flag for the determined packet stream is cleared. In some embodiments, this is achieved by changing the adapt flag for, associated with or corresponding to the determined packet stream in memory, e.g., section 420 data/information of memory 410 from a value of one to a zero. In some embodiments where the adapt flag value is stored in a registered, the registered is cleared by writing a zero value to register. In some embodiments, step 738 is performed by module 570.

Operation proceeds from step 738 to step 740. In step 740 the SRTP packet is accepted. The SRTP packet having passed the authentication check and the decryption. In some embodiments, after being designated as accepted the SRTP packet and/or its data contents are passed on for additional processing. In some embodiments, step 740 is performed by module 572. Operation proceeds from step 740 to steps 742, 744 and 745. Steps 742, 744 and 745 may be performed in parallel or sequentially.

In step 742 the ROC value for the determined SRTP packet stream is updated, for example stored in memory as the correct ROC value for the determined packet stream in those embodiments in which separate memory locations are being used for an estimated ROC and a correct ROC. In some embodiments, step 742 is performed by module 574.

In step 744, the s_1 number sometimes referred to as the next expected sequence number for the determined SRTP packet stream is updated. In some embodiments, step 744 is performed by module 576.

In step 745, the anti-replay-window for the determined SRTP packet stream is updated. In some embodiments, step 745 is performed by module 578.

Operation proceeds from steps 742, 744 and 745 via connection node B 734 to SRTP packet receiving step 708 shown on FIG. 7A where the operation of the method proceeds with the processing of the next received packet. In some embodiments, the updating the s_1 value and anti-replay-window are done in accordance with procedures outlined in RFC 3711.

Some features of various embodiments of the present invention are now described. In some embodiments a new flag called "adapt" in the decryption context of each SRTP call is used. When the adapt flag is set, e.g., in response to a call control signal, the decryption device, e.g., SBC, starts to learn the index sequence number that is the ROC/SEQ used at the encryption side, by trying to authenticate/decrypt each received SRTP packet, starting with roll over count (ROC) equal to zero (ROC=0). If the authentication check fails, the decryption device increments the local ROC by 1 and tries to authenticate/decrypt the next packet. This learning/adapting process stops once a packet passes the authentication check. The decryption device then latches onto to the learned ROC and SEQ from which it can determine the index sequence number, clears the adapt flag, and starts normal decryption operation.

In some embodiments of the present invention, multiple different roll over count values are tried on the same received packet either in parallel or serially until the correct roll over count is determined by a successful authentication of the packet or a threshold number of authentication tests have been performed without success. In some embodiments, the threshold number of authentications tests is based on the speed of the decryption device and the impact on the processing of the SRTP stream of packets.

In some embodiments, to avoid the scenario where the decryption device receives the first packet before it has been updated with the correct master/salt keys that the encryption device is using, or in those cases where the encryption device somehow encrypted the first packet with dated/old master/salt keys, in which case the first packet would fail the authentication check regardless of the ROC value and it would lead to a runaway learning process (since the ROC is 32-bits when using a SRTP format in compliance with RFC 3711), the local ROC in the decrypting device is forcefully reset to zero after a threshold number of tries. The threshold number may be fixed or configurable. In some embodiments, module-16 may be, and is, used to force the local ROC in the decryptor device back to zero in the case of bona fide authentication errors for the first one or first few packets, which mean at most 16 packets could be discarded to authentication failures while the adapt flag is set. Calls shorter than approximately 6 hours shouldn't have any problems with going on hold and then off hold or during a switchover from an active decryptor device such as an SBC to a standby decryptor device such as a standby SBC.

In some embodiments instead of always starting the adaptive learning process with ROC equal zero, the ROC value to start the learning process could be estimated based on how long the call has lasted. In some embodiments, instead of using modulo-16, the number of times the authentication test fails can be tracked and compared to a threshold value to decide if the ROC should be reset to the initial ROC in order to prevent the runaway learning process described above.

In some embodiments, to avoid the runaway learning process discussed above, the ROC value will not be incremented for the first few (say 3) failed authentication packets. In this way, the first few packets will be tried with the same ROC value so that if the authentication failure is a result of the encryption keys, e.g., being wrong then the probability of identifying the correct ROC value quickly is greatly increased. While a threshold of three authentication failures is used in some embodiments, this threshold value of three is only exemplary and may be other values and may also be configurable.

Various embodiments of the present invention are described for SRTP. However, various embodiments of the invention may be, and sometimes are used with other protocols, e.g., other protocols including an implicit index based on a sequence number included with or derivable from information received with a packet and a sequence number roll over count not sent to the receiver but determined at the receiver.

Figure 5A:
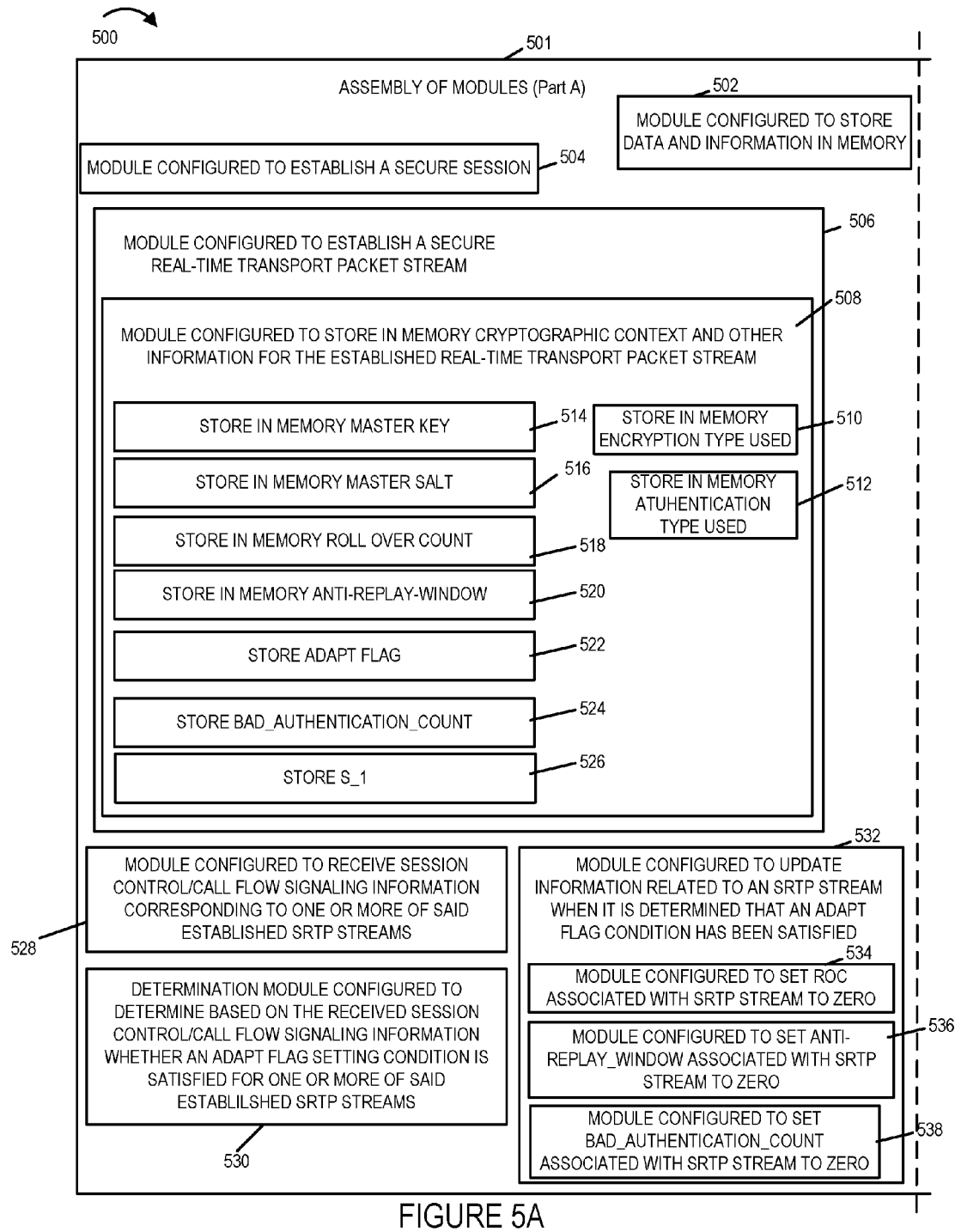
FIG. 5A is a drawing of a first part of an exemplary assembly of modules which may be included in the session border controller of FIG. 4.
Figure 5B:
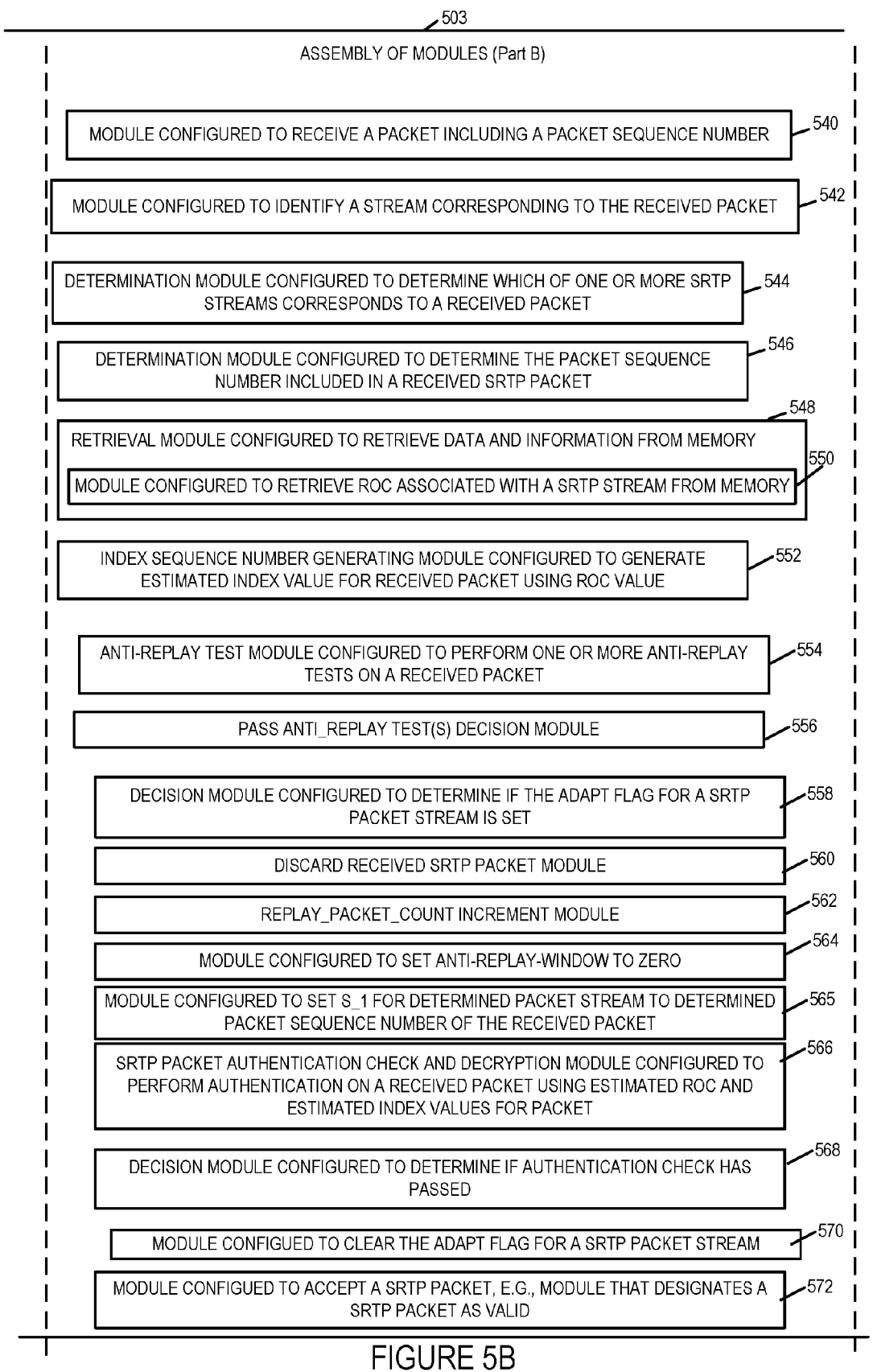
FIG. 5B is a drawing of a second part of an exemplary assembly of modules which may be included in the session border controller of FIG. 4.
Figures 5, 5C:
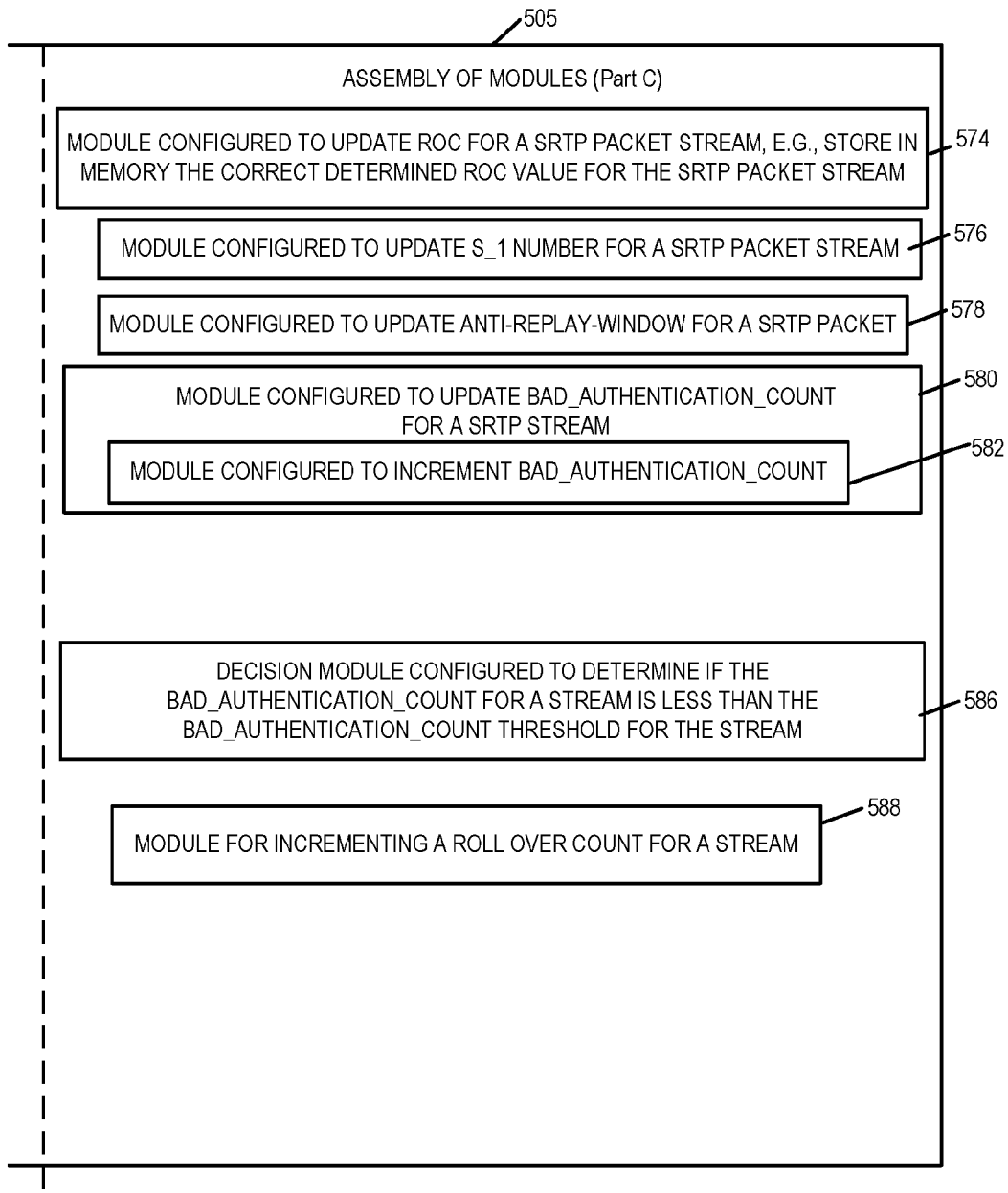
FIG. 5 comprises FIGS. 5A, 5B, and 5C.
FIG. 5C is a drawing of a third part of an exemplary assembly of modules which may be included in the session border controller of FIG. 4.

FIG. 5 illustrates an assembly of modules 500 which can, and in some embodiments is, used in the SBC 400 illustrated in FIG. 4. The modules in the assembly of modules 500 can, and in some embodiments are, implemented fully in hardware within the processor 406, e.g., as individual circuits. The modules in the assembly of modules 500 can, and in some embodiments are, implemented fully in hardware within the assembly of modules 419, e.g., as individual circuits corresponding to the different modules. In other embodiments some of the modules are implemented, e.g., as circuits, within the processor 406 with other modules being implemented, e.g., as circuits within assembly of modules 419, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 410 of the SBC 400, with the modules controlling operation of SBC 400 to implement the functions corresponding to the modules when the modules are executed by a processor, e.g., processor 406. In some such embodiments, the assembly of modules 500 is included in the memory 410 as assembly of modules 418. In still other embodiments, various modules in assembly of modules 500 are implemented as a combination of hardware and software, e.g., with another circuit external to the processor providing input to the processor 406 which then under software control operates to perform a portion of a module's function. While shown in the FIG. 4 embodiment as a single processor, e.g., computer, it should be appreciated that the processor 406 may be implemented as one or more processors, e.g., computers.

When implemented in software the modules include code, which when executed by the processor 406, configure the processor 406 to implement the function corresponding to the module. In embodiments where the assembly of modules 500 is stored in the memory 410, the memory 410 is a computer program product comprising a computer readable medium comprising code, e.g., individual code for each module, for causing at least one computer, e.g., processor 406, to implement the functions to which the modules correspond.

Completely hardware, e.g., circuits, based or completely software based modules may be used. However, it should be appreciated that any combination of software and hardware, e.g., circuit implemented modules may be used to implement the functions. As should be appreciated, the modules illustrated in FIG. 5 control and/or configure the SBC 400 or elements therein such as the processor 406, to perform the functions of the corresponding steps illustrated in the method flowchart 700 of FIG. 7. Thus the assembly of modules 500 includes various modules that perform functions of the corresponding steps of the method shown in FIG. 7.

Figure 8:
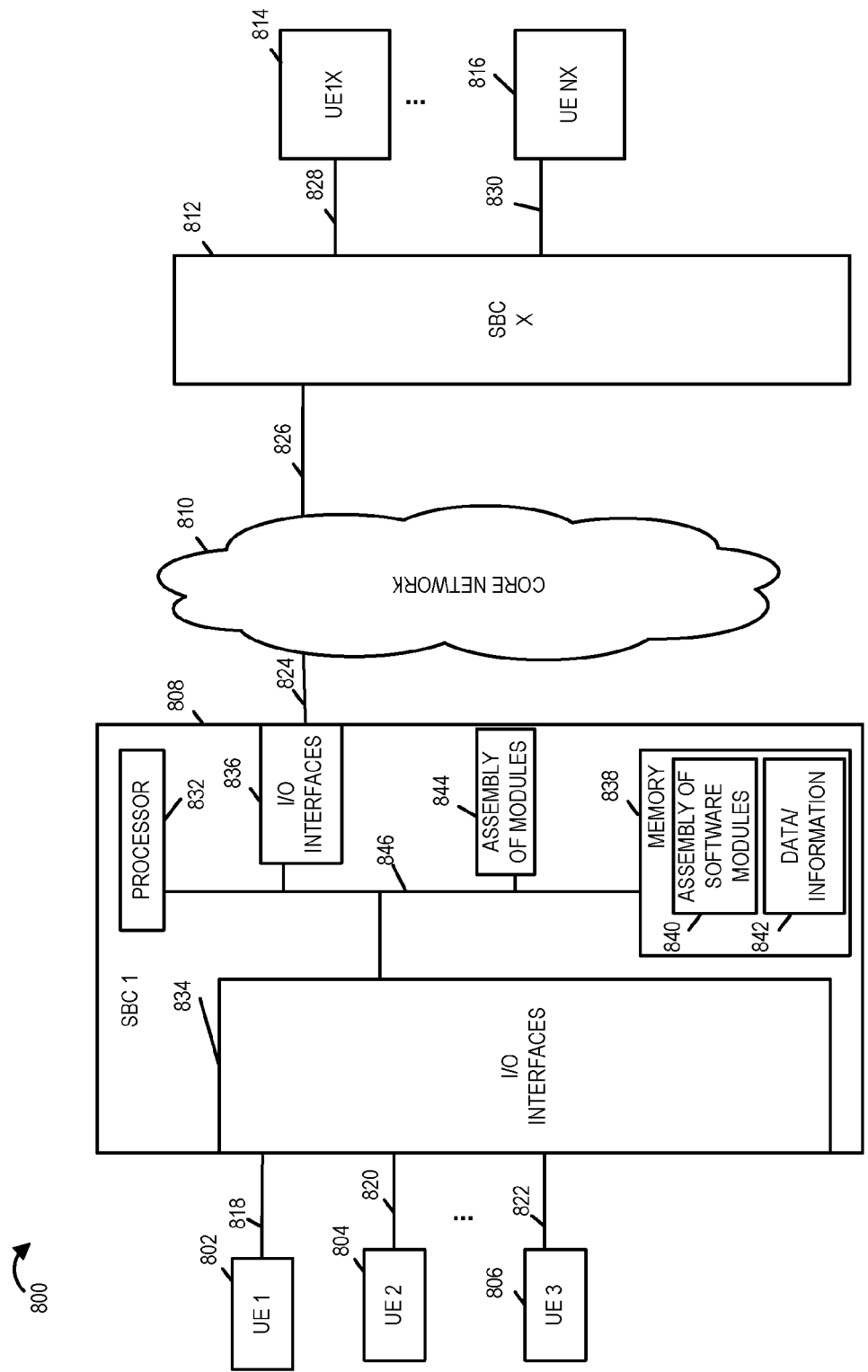
FIG. 8 is a drawing of an exemplary communications system including an exemplary session border controller implemented in accordance with an exemplary embodiment.

FIG. 5, comprising the combination of FIG. 5A, FIG. 5B and FIG. 5C, is an assembly of modules 500, including Part A 501, Part B 503 and Part C 505, which may be included in an exemplary session border controller, e.g., session border controller 400 of FIG. 4, 102 of FIG. 1, 104 of FIG. 1, 202, 204 or 206 of FIG. 2, 808 of FIG. 8 in accordance with an exemplary embodiment, Assembly of modules 500 includes a module 502 configured to store data and information in memory, a module 504 configured to establish a secure session, a module 506 configured to establish a secure real-time transport packet stream. In some embodiments, module 506 includes sub-module 508 configured to store in memory crytpographic context and other information for the established real-time transport packet stream. In some embodiments, sub-module 508 includes sub-modules 510, 512, 514, 516, 518, 520, 522, 524, and 526. Sub-module 510 is configured to store in memory the encryption type to be used for the associated SRTP packet stream.

Module 542 is configured to identify a stream corresponding to the received packet. Sub-module 512 is configured to store in memory the authentication type to be used for the associated SRTP packet stream. Sub-module 514 is configured to store in memory the master key to be used for the associated SRTP packet stream. Sub-module 516 is configured to store in memory the master salt to be used for the associated SRTP packet stream. Sub-module 518 is configured to store in memory sequence number roll over count associated with SRTP packet stream. Sub-module 520 is configured to store in memory anti-replay-window associated with SRTP packet stream. Sub-module 522 is configured to store in memory an adapt flag associated with SRTP packet stream. Sub-module 524 is configured to store in memory bad_authentication_count associated with SRTP packet stream. Sub-module 526 is configured to store in memory anti-replay-window associated with SRTP packet stream.

Assembly of modules 500 also includes module 528 configured to receive session control/call flow signaling information corresponding to one or more of the established SRTP streams, determination module 530 configured to determine based on the received session control/call flow signaling information whether an adapt flag setting condition is satisfied for one or more of said established SRTP streams, a module 532 configured to update information related to an SRTP stream when it is determined that an adapt flag condition has been satisfied including in some embodiments sub-modules 534, 536 and 538. Sub-module 534 configured to set ROC associated with the SRTP stream to zero. Sub-module 536 configured to set anti-replay-window associated with SRTP stream to zero. Sub-module 538 configured to set bad_authentication_count associated with the SRTP stream to zero.

Assembly of module 500 further includes module 540 shown on FIG. 5B configured to receive a packet including a packet sequence number, module 542 configured to identify a stream corresponding to the received packet, determination module 544 configured to determine which of the one or more SRTP stream corresponds to a received packet, determination module 546 configured to determine the packet sequence number included in a received SRTP packet, retrieval module 548 configured to retrieve data and information from memory. In some embodiments retrieval module 548 includes a sub-module 550 configured to retrieve ROC associated with a SRTP stream from memory.

Assembly of modules 500 also includes index sequence number generating module 552 configured to generate an estimated index value for a received packet using an ROC value which may be an estimated ROC value, an anti-replay test module 554 configured to perform one or more anti-replay tests on a received packet, a pass anti-replay tests decision module 556, a decision module 558 configured to determine if the adapt flag for a SRTP packet stream is set, a discard received SRTP packet module 560, a replay_packet_count increment module 562, a module 564 configured to set the anti-replay-window for a packet stream to zero, a module 565 configure to set s_1 value for a determined packet stream to be the determined packet sequence number recovered from a received packet being processed, a SRTP packet authentication check and decryption module 566 configured to perform an authentication check on a received packet using an estimated ROC for the received packet, an estimated index value for the received packet, an authentication information included in the received packet, a decision module 568 configured to determine if a received packet has passed an authentication check, a module 570 configured to clear the adapt flag for a SRTP packet stream, a module 572 configured to accept a SRTP packet. In some embodiments, the module 572 includes a sub-module that designates the SRTP packet that has been accepted as being valid.

Assembly of modules 500 further includes module 574 configured to update the ROC for a SRTP stream, e.g., by storing in memory the correct determined ROC value for the SRTP packet stream, a module 576 configured to update s_1 number for a SRTP packet stream, a module 578 configured to update the anti-replay-window for a SRTP stream, a module 580 configured to update the bad_authentication_count for a SRTP stream. In some embodiments, the module 580 includes a sub-module 582 configured to increment the bad_authentication_count.

Assembly of modules further includes a decision module 586 configured to determine if the bad_authentication_count for a stream is less than the bad_authentication_count threshold for the stream, and a module 588 for incrementing a roll over count for a stream.

Figure 6:
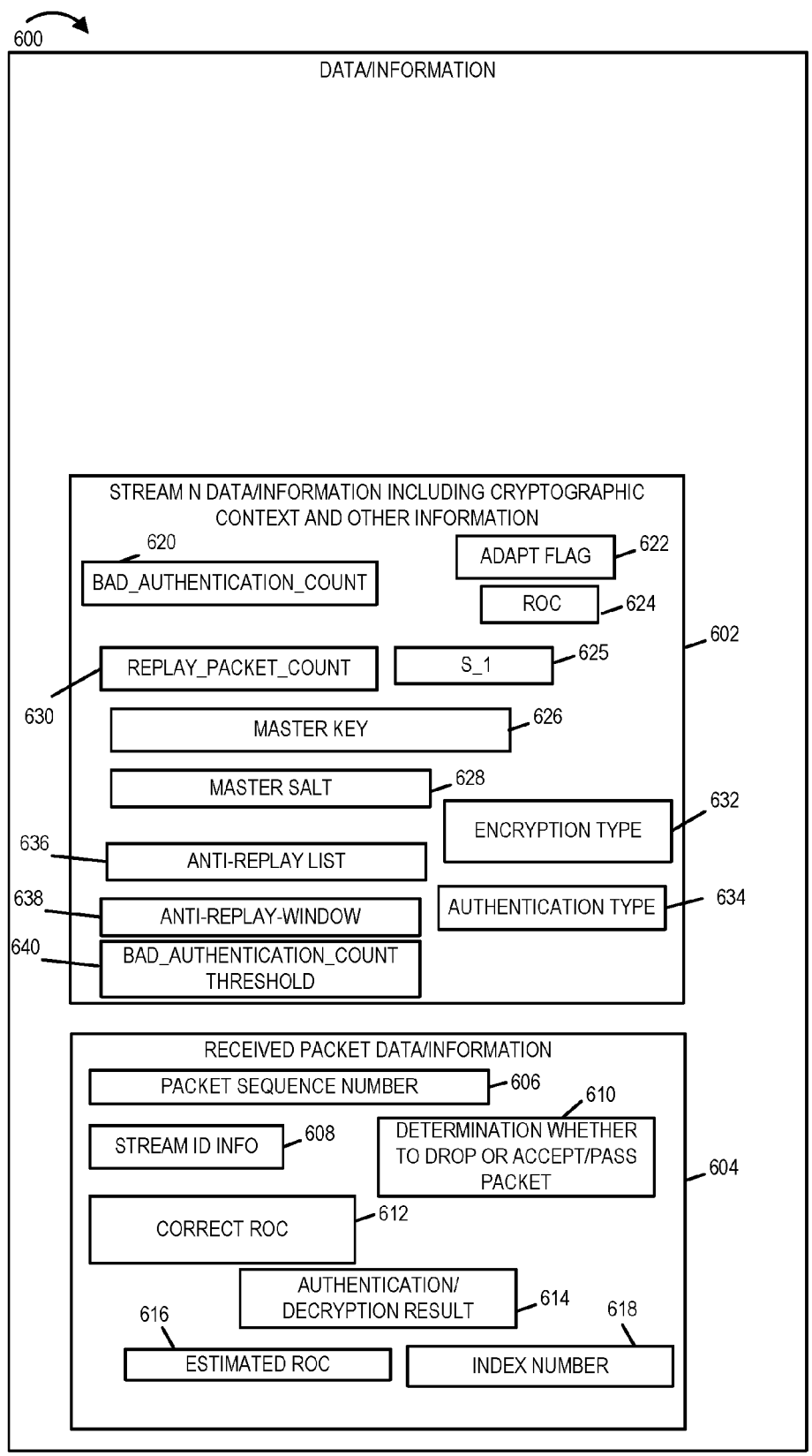
FIG. 6 is a drawing of exemplary data/information which may be included in the session border controller of FIG. 4.

FIG. 6 is a drawing of exemplary data/information 600, which may be included in exemplary data/information 420 of memory 410 of session border controller 400 of FIG. 4, in accordance with an exemplary embodiment.

Data/information 600 includes data and information used for processing of sessions, secure real-time transport protocol packets, VOIP calls, signaling information, stream cryptographic context information, and received packet data/information. Data/information memory 602 is exemplary data/information stored in memory for processing an exemplary stream of packets N including cryptographic context and other information associated with or corresponding to stream N. Stream N data/information 602 includes bad_authentication_count 620, adapt flag 622, roll over count (ROC) 624, s_1 sequence number 625 corresponding to stream N, master key 626, master salt 628, replay_packet_count 630, encryption type 632, authentication type 634, anti-replay list 636, an anti-replay window 638, and bad_authentication_count threshold 640. While the data/information for a single packet stream N has been illustrated the same or similar data/information is stored in memory for each packet stream being processed. In addition in some embodiments a second bad_authentication_count is stored in memory said second bad_authentication_count. The second bad_authentication_count threshold being a threshold that when exceeded during processing of packets during the adaptive learning index mode of operation causing the decryptor device to perform one of the following actions: (1) reset the ROC count to zero for the associated packet stream, (2) re-establish the SRTP packet stream, or (3) request a change of an encryption key for the packet stream.

Received packet data/information 604 includes a packet sequence number 606 recovered from the received packet, stream ID information 608, and a determination as to whether to drop or pass the received packet 610, a correct ROC value, an authentication/decryption result 614, an estimated ROC 616, and index number 618. In some embodiments the index number is used for the estimated index number. While the received packet data/information is shown for a single packet, the same or similar data will be stored in memory of each received packet.

FIG. 8 illustrates an exemplary system 800 implemented in accordance with an exemplary embodiment of the invention. System 800 includes a plurality of user devices also sometimes referred to as end points (UE 1 802, UE 2 804, . . . , UE N 806) which are coupled to a session border controller 1 (SBC 1) 808 through links (818, 820, . . . , 822) respectively. SBC 1 808 is coupled to a core network 810 via link 824. System 800 further includes a second session border controller, SBC X 812, which is coupled to the core network via link 826. SBC X 812 is also coupled to a plurality of user devices also sometimes referred to as end points (UE 1X 814, . . . , UE NX 816) via links (828, . . . , 830), respectively. Each of the user devices or endpoints may, and in some embodiments do, include one or more applications that can establish one or more secure VOIP calls by establishing sessions using Session Initiation Protocol (SIP) and within the sessions, SRTP streams. The core network 808 may include one or more network elements. The session border controllers SBC 1 808 and SBC X 812 are packet-oriented networking equipment which process packet flows, e.g., packets flows including, e.g., RTP packet flows, RTCP packet flows, SRTP packet flows, and SRTCP flows. The SBCs (808, . . . , 812) in system 800, which are implemented in accordance with various features of the present invent, can synchronize decryption state information such as a roll over count for a sequence number for a packet with the remote encryption state of the roll over count. The processing performed by the SBCs (808, . . . , 812) include operating in an adaptive index learning mode of operation or a non-adaptive mode of operation for processing of packets for processing of received packets.

The exemplary session border controllers (808, . . . , 812) included in system 100 implement a method in accordance with flowchart 700 of FIG. 7 and/or are implemented in accordance with exemplary SBC 400 of FIG. 4 and/or include modules in accordance with assembly of modules 500 of FIG. 5.

Exemplary session border controller SBC 1 802 includes a processor 832, Input/Output (I/O) interfaces 834, I/O Interfaces 836, memory 838, and assembly of modules 844 coupled together via bus 846 through which the various elements can communicate with one another. SBC 1 808 uses its Input/Output Interfaces (I/O Interfaces) 834 for communicating with user equipment (UE 1 802, UE 2 804, . . . , UE N 806) via communication links (818, 820, . . . , 822), respectively. SBC 1 808 uses I/O Interfaces 836 for communicating with the core network 810 via link 824. Assembly of modules 844 perform various operations. Processor 832, assembly of modules 844, memory 838 and I/O Interfaces 834 and 836 are coupled to communication bus 846 through which they can communicate. Memory 838 includes an assembly of software modules 840, e.g., routines, and data/information 842. Processor 832 may execute routines in assembly of software modules 840 and use data/information 842 to implement steps of an exemplary method.

In one exemplary embodiment, SBC 1 808 of FIG. 8 is SBC 400 of FIG. 4; I/O interfaces 834 are I/O interfaces 408; I/O interfaces 836 are I/O interfaces 409; processor 832 is processor 406; memory 838 is memory 410; assembly of modules 844 is assembly of modules 419; and assembly of software modules 840 is assembly of modules 418; data/information 842 is data/information 420.

The techniques of various embodiments may be implemented using software, hardware and/or a combination of software and hardware. Various embodiments are directed to apparatus, e.g., communications device such as a session border controllers, e.g., a session border controller, etc. Various embodiments are also directed to methods, e.g., a method of operating a communications device such as a session border controller, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware, e.g., circuits, or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a session border controller (SBC) including a processor configured to implement one, multiple or all of the steps of one or more methods of the invention.

In some embodiments, the processor or processors, e.g., CPUs, of one or more devices, e.g., of the communications device, e.g., session border controller, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a session border controller, with a processor which includes a module corresponding to each of the steps of the various described methods performed by the device in which the processor is included. In some but not all embodiments an apparatus, e.g., a communications device, e.g., a session border controller, includes a module corresponding to each of the steps of the various described methods performed by the device in which the processor is included. The modules may be implemented using software and/or hardware. The hardware may be circuits, ASICs or other specialized or dedicated circuitry.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A secure communications method, the method comprising:
receiving signaling information corresponding to a secure real time packet stream;
receiving a plurality of encrypted secure real time packets, said plurality of packets being a part of said secure real time packet stream, said secure real time packet stream using an implicit packet index for sequencing of packets in said secure real time packet stream, said implicit packet index being generated from a sequence number and a sequence number roll over counter number, said sequence number for each of said plurality of packets being included in each of said packets, said roll over counter number for each of said plurality of packets not being included with said packets;
determining, based at least in part on the received signaling information, whether an adaptive index learning process condition is satisfied for the secure real time packet stream; and
storing in memory an indication that the adaptive index learning process condition is satisfied when said determination is that said condition is satisfied; and
when said adaptive index learning process condition is satisfied using an adaptive index learning process to determine a correct estimated sequence number roll over counter number for one of said plurality of received packets, and
after determining said correct estimated sequence number roll over counter number for one of said plurality of received packets storing in said memory an indication that said adaptive index learning process condition is no longer satisfied; and
wherein said adaptive index learning process includes:
setting an estimated sequence number roll over counter number to zero after a determination that said adaptive index learning process condition is satisfied for the secure real time packet stream;
performing an authentication test on one or more of the received packets received using said estimated sequence number roll over counter number; and
when said authentication test fails discarding each packet which fails the authentication test and incrementing said estimated sequence number roll over counter number after a predetermined number of received packets fail said authentication test, and
when said authentication test passes accepting said packet as being valid.

2. The method of claim 1 wherein said predetermined number of received packets is one, said method further including:
generating a first packet index sequence number using a first sequence number and said estimated sequence number roll over counter number set to zero when it is determined that said adaptive index learning process condition exists, said first sequence number being included in a first packet received after determining that said adaptive index learning process condition exists; and
wherein said performing an authentication test on one or more of the received packets using said estimated sequence number roll over counter number includes performing an authentication test on said first packet using said estimated sequence number roll over counter number and authentication information included in said first received packet; and
when said authentication test on said first packet fails generating a second packet index sequence number using a second sequence number and said incremented estimated sequence number roll over counter number, said second sequence number being included in a second packet received after said first packet.

3. The method of claim 2 further including performing an authentication test on said second packet using said incremented estimated sequence number roll over counter number and authentication information included in said second received packet and discarding said second packet and incrementing said estimated sequence number roll over counter number when said authentication test fails.

4. The method of claim 1, wherein said signaling information includes at least one of the following: session control signaling information, call flow signaling information or decryption device status signaling information.

5. The method of claim 4, wherein said plurality of encrypted secure real time packets are part of a Voice Over Internet Protocol (VOIP) call and wherein determining, based at least in part on the received signaling information, whether an adaptive index learning process condition is satisfied for the secure real time packet stream includes determining that said adaptive index learning process condition is satisfied for the secure real time packet stream when said signaling information is call flow signaling information indicating that said VOIP call is resuming after having been placed on hold.

6. The method of claim 4, wherein said plurality of encrypted secure real time packets are part of a Voice Over Internet Protocol (VOIP) call received at a standby Session Border Controller and wherein determining, based at least in part on the received signaling information, whether an adaptive index learning process condition is satisfied for the secure real time packet stream includes determining that said adaptive index learning process condition is satisfied for the secure real time packet stream when said signaling information includes status information indicating that the processing of said VOIP call is to be switched from an active Session Border Controller servicing said VOIP call to said standby Session Border Controller.

7. The method of claim 4, wherein said plurality of encrypted secure real time packets are part of a Voice Over Internet Protocol call received at a Session Border Controller and wherein determining, based at least in part on the received signaling information, whether an adaptive index learning process condition is satisfied for the secure real time packet stream includes determining that said adaptive index learning process condition is satisfied for the secure real time packet stream when said signaling information is session information indicating a change in encryption keys.

8. The method of claim 1, wherein said adaptive index learning process further includes:
not performing anti-replay packet testing when said adaptive index learning process condition is satisfied.

9. A secure communications method, the method comprising:
receiving signaling information corresponding to a secure real time packet stream;
receiving a plurality of encrypted secure real time packets, said plurality of packets being a part of said secure real time packet stream, said secure real time packet stream using an implicit packet index for sequencing of packets in said secure real time packet stream, said implicit packet index being generated from a sequence number and a sequence number roll over counter number, said sequence number for each of said plurality of packets being included in each of said packets, said roll over counter number for each of said plurality of packets not being included with said packets;
determining, based at least in part on the received signaling information, whether an adaptive index learning process condition is satisfied for the secure real time packet stream; and
storing in memory an indication that the adaptive index learning process condition is satisfied when said determination is that said condition is satisfied; and
when said adaptive index learning process condition is satisfied using an adaptive index learning process to determine a correct estimated sequence number roll over counter number for one of said plurality of received packets, and
after determining said correct estimated sequence number roll over counter number for one of said plurality of received packets storing in said memory an indication that said adaptive index learning process condition is no longer satisfied; and
wherein said adaptive index learning process includes:
setting a plurality of estimated sequence number roll over counter numbers to different values after a determination that said adaptive index learning process condition is satisfied for the secure real time packet stream;
performing a plurality of authentication tests on a packet received after said determination that said adaptive index learning process condition is satisfied for the secure real time packet stream using said plurality of estimated sequence number roll over counter numbers, said packet being one of said plurality of encrypted secure real time packets; and
when all of said plurality of authentication tests fail discarding said packet, and
when one of said authentication test passes accepting said packet as being valid and storing the estimated sequence number roll over counter number used in the authentication test that passed in memory as the correct estimated sequence number roll over counter number.

10. The method of claim 9 wherein said correct estimated sequence number roll over counter number is stored in memory as part of cryptographic context information for the secure real time packet stream.

11. A multi-mode secure communications decrypting device comprising:
a receiver configured to receive signaling information corresponding to a secure real time packet stream and a plurality of encrypted secure real time packets, said plurality of packets being a part of the secure real time packet stream, said secure real time packet stream using an implicit packet index for sequencing of packets in said secure real time packet stream, said implicit packet index being generated from a sequence number and a sequence number roll over counter number, said sequence number for each of said plurality of packets being included in each of said packets, said roll over counter number for each of said plurality of packets not being included with said packets;
memory;
one or more processors configured to:
determine, based at least in part on the received signaling information, whether an adaptive index learning process condition is satisfied for the secure real time packet stream;
store in said memory an indication that the adaptive index learning process condition is satisfied when said one or more processors determines that said condition is satisfied;
use an adaptive index learning process to determine a correct estimated sequence number roll over counter number for one of said plurality of received packets when said adaptive index learning process condition is satisfied; and
store in said memory an indication that said adaptive index learning process condition is no longer satisfied after said one or more processors determines said correct estimated sequence number roll over counter number for one of said plurality of received packets;
wherein said one or more processors is further configured to:
set an estimated sequence number roll over counter number to zero after a determination that said adaptive index learning process condition is satisfied for the secure real time packet stream;

perform an authentication test on one or more of the received packets received using said estimated sequence number roll over counter number;

increment said estimated sequence number roll over counter number after a predetermined number of received packets fail said authentication test, when said authentication test fails discarding each packet which fails the authentication test; and accept said packet as being valid when said authentication test passes.

12. The device of claim 11,
wherein said predetermined number of received packets is one; and
wherein said one or more processors is further configured to:
generate a first packet index sequence number using a first sequence number and said estimated sequence number roll over counter number set to zero when it is determined that said adaptive index learning process condition exists, said first sequence number being included in a first packet received after determining that said adaptive index learning process condition exists;
perform an authentication test on said first packet using said estimated sequence number roll over counter number and authentication information included in said first received packet as part of performing an authentication test on one or more of the received packets using said estimated sequence number roll over counter sequence number; and
when said authentication test fails:
i) increment said estimated sequence number roll over counter number, and
ii) generate a second packet index sequence number using a second sequence number and said incremented estimated sequence number roll over counter number, said second sequence number being included in a second packet received after said first packet.

13. The device of claim 12 wherein said one or more processors is further configured to:
perform an authentication test on said second packet using said incremented estimated sequence number roll over counter number and authentication information included in said second received packet; and
discard said second packet and increment said estimated sequence number roll over counter number when said authentication test fails.

14. The device of claim 11, wherein said signaling information includes at least one of the following: session control signaling information, call flow signaling information or decryption device status signaling information.

15. The device of claim 14,
wherein said plurality of encrypted secure real time packets are part of a Voice Over Internet Protocol (VOIP) call, and
wherein said one or more processors is further configured to determine that said adaptive index learning process condition is satisfied for the secure real time packet stream when said signaling information is call flow signaling information indicating that said VOIP call is resuming after having been placed on hold.

16. The device of claim 14,
wherein said plurality of encrypted secure real time packets are part of a Voice Over Internet Protocol (VOIP) call received at a standby Session Border Controller, and
wherein said one or more processors is further configured to determine that said adaptive index learning process condition is satisfied for the secure real time packet stream when said signaling information includes status information indicating that the processing of said VOIP call is to be switched from an active Session Border Controller servicing said VOIP call to said standby Session Border Controller.

17. The device of claim 14, wherein said plurality of encrypted secure real time packets are part of a Voice Over Internet Protocol call received at a Session Border Controller and wherein determining, based at least in part on the received signaling information, whether an adaptive index learning process condition is satisfied for the secure real time packet stream includes determining that said adaptive index learning process condition is satisfied for the secure real time packet stream when said signaling information is session information indicating a change in encryption keys.

18. The device of claim 11, wherein said adaptive index learning process includes not performing anti-replay packet testing when said adaptive index learning process condition is satisfied.

19. A multi-mode secure communications decrypting device comprising:
a receiver configured to receive signaling information corresponding to a secure real time packet stream and a plurality of encrypted secure real time packets, said plurality of packets being a part of the secure real time packet stream, said secure real time packet stream using an implicit packet index for sequencing of packets in said secure real time packet stream, said implicit packet index being generated from a sequence number and a sequence number roll over counter number, said sequence number for each of said plurality of packets being included in each of said packets, said roll over counter number for each of said plurality of packets not being included with said packets;
memory;
one or more processors configured to:
determine, based at least in part on the received signaling information, whether an adaptive index learning process condition is satisfied for the secure real time packet stream;
store in said memory an indication that the adaptive index learning process condition is satisfied when said one or more processors determines that said condition is satisfied;
use an adaptive index learning process to determine a correct estimated sequence number roll over counter number for one of said plurality of received packets when said adaptive index learning process condition is satisfied; and
store in said memory an indication that said adaptive index learning process condition is no longer satisfied after said one or more processors determines said correct estimated sequence number roll over counter number for one of said plurality of received packets;
wherein said one or more processors is further configured to:
set a plurality of estimated sequence number roll over counter numbers to different values after a determination that said adaptive index learning process condition is satisfied for the secure real time packet stream;

perform a plurality of authentication tests on a packet received after said determination that said adaptive index learning process condition is satisfied for the secure real time packet stream using said plurality of estimated sequence number roll over counter numbers, said packet being one of said plurality of encrypted secure real time packets; and discard said packet when all of said plurality of authentication tests fail; and accept said packet as being valid when one of said authentication tests passes; and store in memory the estimated sequence number roll over counter number used in the authentication test that passed as the correct estimated sequence number roll over counter number.

20. The device of claim 19 wherein said correct estimated sequence number roll over counter number is stored in memory as part of cryptographic context information for the secure real time packet stream.

* * * * *